United States Patent
Subhraveti

(10) Patent No.: US 8,209,707 B2
(45) Date of Patent: Jun. 26, 2012

(54) GATHERING STATE INFORMATION FOR AN APPLICATION AND KERNEL COMPONENTS CALLED BY THE APPLICATION

(75) Inventor: Dinesh Kumar Subhraveti, Milpitas, CA (US)

(73) Assignee: Google Inc., Mountain View, CA (US)

( * ) Notice: Subject to any disclaimer, the term of this patent is extended or adjusted under 35 U.S.C. 154(b) by 1142 days.

(21) Appl. No.: 12/013,349

(22) Filed: Jan. 11, 2008

(65) Prior Publication Data

US 2009/0183174 A1 Jul. 16, 2009

(51) Int. Cl.
*G06F 9/44* (2006.01)
*G06F 7/00* (2006.01)

(52) U.S. Cl. ............... 719/317; 707/649; 719/331

(58) Field of Classification Search ............ 707/649; 719/317, 331
See application file for complete search history.

(56) References Cited

U.S. PATENT DOCUMENTS

| | | | |
|---|---|---|---|
| 6,105,148 A | 8/2000 | Chung et al. | |
| 6,161,219 A | 12/2000 | Ramkumar et al. | |
| 6,766,471 B2* | 7/2004 | Meth ............... | 714/16 |
| 7,161,926 B2* | 1/2007 | Elson et al. ............ | 370/338 |
| 7,536,591 B2* | 5/2009 | Varadarajan et al. ....... | 714/15 |
| 7,644,413 B2* | 1/2010 | Wong et al. ............ | 719/323 |
| 7,657,787 B2* | 2/2010 | Turner et al. ........... | 714/15 |
| 7,773,096 B2* | 8/2010 | de Souza et al. ......... | 345/619 |
| 7,793,153 B2 | 9/2010 | Bonzo et al. | |
| 2003/0088807 A1* | 5/2003 | Mathiske et al. ......... | 714/6 |
| 2006/0085679 A1 | 4/2006 | Neary et al. | |
| 2006/0150010 A1 | 7/2006 | Stiffler et al. | |
| 2008/0002578 A1* | 1/2008 | Coffman et al. ......... | 370/230 |
| 2008/0229323 A1* | 9/2008 | Mackey ............... | 719/311 |
| 2010/0057932 A1* | 3/2010 | Pope et al. ............ | 709/236 |

OTHER PUBLICATIONS

Litzkow, et al., "Condor—A Hunter of Idle Workstations", IEEE, 8th International Conference on Distributed Computing Systems, San Jose, CA, 1988, pp. 104-111.
Litzkow, et al., "Supporting Checkpointing and Process Migration Outside the Unix Kernel", Usenix Winter Conference, San Francisco, CA 1992.
"Inside Microsoft Windows 2000, Third Edition", Microsoft, [online] [retrieved Nov. 30, 2007] http://www.microsoft.com/mspress/books/sampchap/4354a.aspx.
Dieter, et al., "User-Level Checkpointing for Linux Threads Programs", Proceedings of the FREENIX Track, Usenix Annual Technical Conference, Boston, MA, Jun. 2001, pp. 81-92.
Osman, et al., "The Design and Implementation of Zap: A System for Migrating Computing Environments", Proceedings of the 5th Operating Systems Design and Implementation (OSDI 2002), Boston, MA, Dec. 2002.
"Microsoft Windows Internals, Fourth Edition: Microsoft Windows Server 2003, Windows XP, and Windows 2000", Microsoft, [online] [retrieved Nov. 25, 2007] http://book.itzero.com/read/microsoft/0507/Microsoft.Press.Microsoft.

(Continued)

*Primary Examiner* — Charles E Anya

(57) ABSTRACT

Provided are a method, system, and article of manufacture for gathering state information for an application and kernel components called by the application. An implementation of a component to execute in a kernel space is instantiated in a user space. An application invokes a call to the component in the kernel space. The call to the component in the kernel space is invoked and an implementation of the component in the user space is invoked to execute the call in the user space. State information related to the execution of the call to the component in the user space to include in checkpoint information for the application is gathered.

22 Claims, 3 Drawing Sheets

OTHER PUBLICATIONS

Mogul, et al., "Unveiling the Transport", ACM SIGCOMM Computer Communications Review, vol. 34, No. 1, Jan. 2004, pp. 99-106.

US Patent Application entitled "Gathering Pages Allocated to an Application to Include in Checkpoint Information", Serial No. unknown, filed Jan. 11, 2008, by inventor D.K. Subhraveti.

US Patent Application entitled "Checkpointing and Restoring User Space Data Structures Used by an Application", Serial No. unknown, filed Jan. 11, 2008, by inventor D.K. Subhraveti.

First Office Action for U.S. Appl. No. 12/013,344, dated Apr. 14, 2011, 15 pgs.

Response to First Office Action for U.S. Appl. No. 12/013,344, dated Jul. 14, 2011, 12 pgs.

Final Office Action dated Sep. 26, 2011, pp. 1-24, for U.S. Appl. No. 12/013,344, filed Jan. 11, 2008, by inventors Dinesh K. Subhraveti et al.

* cited by examiner

GATHERING STATE INFORMATION FOR AN APPLICATION AND KERNEL COMPONENTS CALLED BY THE APPLICATION

BACKGROUND OF THE INVENTION

1. Field of the Invention

The present invention relates to a method, system, and article of manufacture for gathering state information for an application and kernel components called by the application.

2. Description of the Related Art

An operating system may designate processes that are assigned to execute applications and components as running in a user space or kernel space. Typically, user applications are assigned to execute in the user address space and essential operations are assigned to execute in the kernel address space, such as resource allocation, low-level hardware interfaces, security, etc. A process may comprise one or more threads allocated to processor and computer resources to execute computer instructions. Multiple processes or multiple threads in one process may concurrently execute instructions for one application, or multiple processes may concurrently execute instructions for multiple applications. Multiple processes may execute on multiple processors. The term "process" as used herein refers to a process, thread or any other unit of execution allocated to execute instructions.

Certain applications may gather state information on the execution of an application to store in checkpoint information. The state of an application maintained in checkpoint information may be used for debugging, development and record and replay purposes. A record and replay program would allow the recreation of an application state to recreate the application so that it may run from the state as indicated in the checkpoint information.

To fully record the state information of an application, the state of kernel components the application calls would also have to be recorded. For instance, the application may call a graphics engine or network stack for network communication that are implemented in the kernel space. Proprietary operating systems, such as Windows®, a registered trademark of Microsoft Corporation, may not provide the tools to enable easy access to the state and system information of kernel components that are called by an application.

There is a need in the art for improved techniques to gather state and system information related to application execution to allow improved recording of the checkpoint information for the application.

SUMMARY

Provided are a method, system, and article of manufacture for gathering state information for an application and kernel components called by the application. An implementation of a component to execute in a kernel space is instantiated in a user space. An application invokes a call to the component in the kernel space. The call to the component in the kernel space is invoked and an implementation of the component in the user space is invoked to execute the call in the user space. State information related to the execution of the call to the component in the user space to include in checkpoint information for the application is gathered.

In a further embodiment, the checkpoint information includes system information related to operations of the application and the execution of the calls to the implementation of the component in the user space, and a state of memory regions used by the application.

In a further embodiment, the intercepted call is translated to a format compatible with implementation of component in the user space, wherein the translated call is invoked to the implementation of the component.

In a further embodiment, the implementation of the component in the user space comprises a subsystem that executes in the user space, and wherein the state information of the subsystem related to the call from the application is gathered for the checkpoint information.

In a further embodiment, the application is loaded and initialized and an agent is loaded in response to loading the application. The agent intercepts the application calls to the component in the kernel space and invokes the call to the implementation of the component in the user space.

In a further embodiment, the agent instantiates the implementation of the component executing in a kernel space in the user space.

In a further embodiment, wherein intercepting the call comprises modifying, by the agent, the call made by the application to invoke the implementation of the component in the user space to execute the call in the user space.

In a further embodiment, wherein the component comprises a network communication data structure residing in the kernel space that is used to process network communication packets. The implementation of the component in the user space comprises the network communication data structure in the user space used to process the network communication packets.

In a further embodiment, the component comprises a graphics engine residing in the kernel space that is used to calls to a graphics engine to render graphics, and wherein the implementation of the component in the user space comprises a graphics subsystem in the user space used to process the calls to the graphics engine and render graphics.

DETAILED DESCRIPTION

Figure 1:
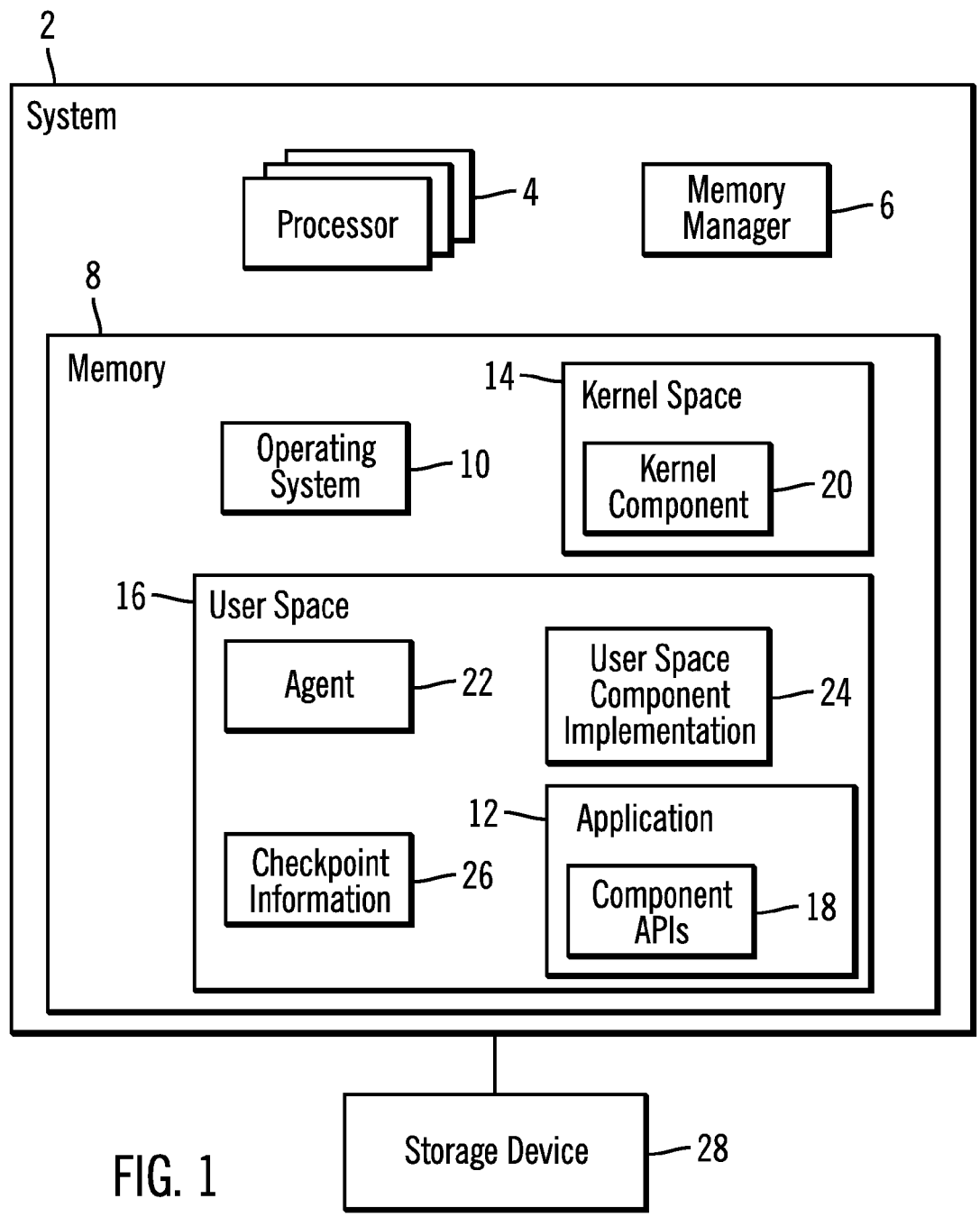
FIG. 1 illustrates an embodiment of a computing environment.

FIG. 1 illustrates an embodiment of a computing environment. A system 2 includes multiple processors 4 and a memory manager 6 managing access to a memory 8. The processor 4 loads into the memory 8 an operating system 10 providing a runtime environment for one or more applications 12. An operating system scheduler may spawn tasks that perform the application 12 operations. The tasks spawned to perform application operations may comprise processes, threads, other units of execution allocated by the operating system, etc. The memory manager 6 may map received virtual addresses used by the operating system 10 and processes to addresses memory pages.

The operating system 10 may allocate processes operating in the memory 6 into a kernel space 14 and a user space 16. Higher priority applications and operating system processes may execute in the kernel space 14. The application 12 executing in the user space 16 may invoke component application programming interfaces (APIs) 18 to call kernel components 20 executing in the kernel space 14, such as a network stack storing packets for network transmission or a graphics engine to render graphics on a display monitor. The kernel components 20 may comprise other high priority applications and subsystems that typically execute in the kernel space 14.

An agent 22 is loaded and initialized when the application 12 is loaded and initialized. The agent 22 initializes a user space implementation 24 of the kernel components 14 called by the application 12 in the user space 16, or user space component implementation 24. The agent 22 may gather information related to the application 12's execution of the user space component implementation 24. The agent 22 may store the gathered information as checkpoint information 26 to provide state information related to the application 12 execution, including system information on the execution of the components called by the application 12. This checkpoint information 26 may be used to replicate the application 12 state on the same or different systems 2 by restoring the application 12 to the state indicated in the checkpoint information 26. The applications 12 and other data may be stored and loaded from a storage 28, such as a non-volatile storage device.

In one embodiment, the kernel component 20 and user space component implementation 24 may exist simultaneously. In alternative embodiments, only the user space component 24 may remain in memory 8.

Figure 2:
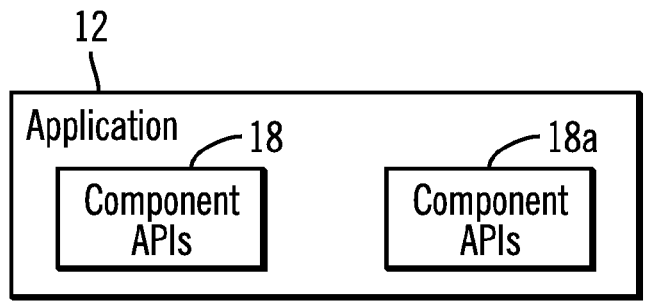
FIG. 2 illustrates an embodiment of how a component call is translated to a modified component call.
Figure 3:
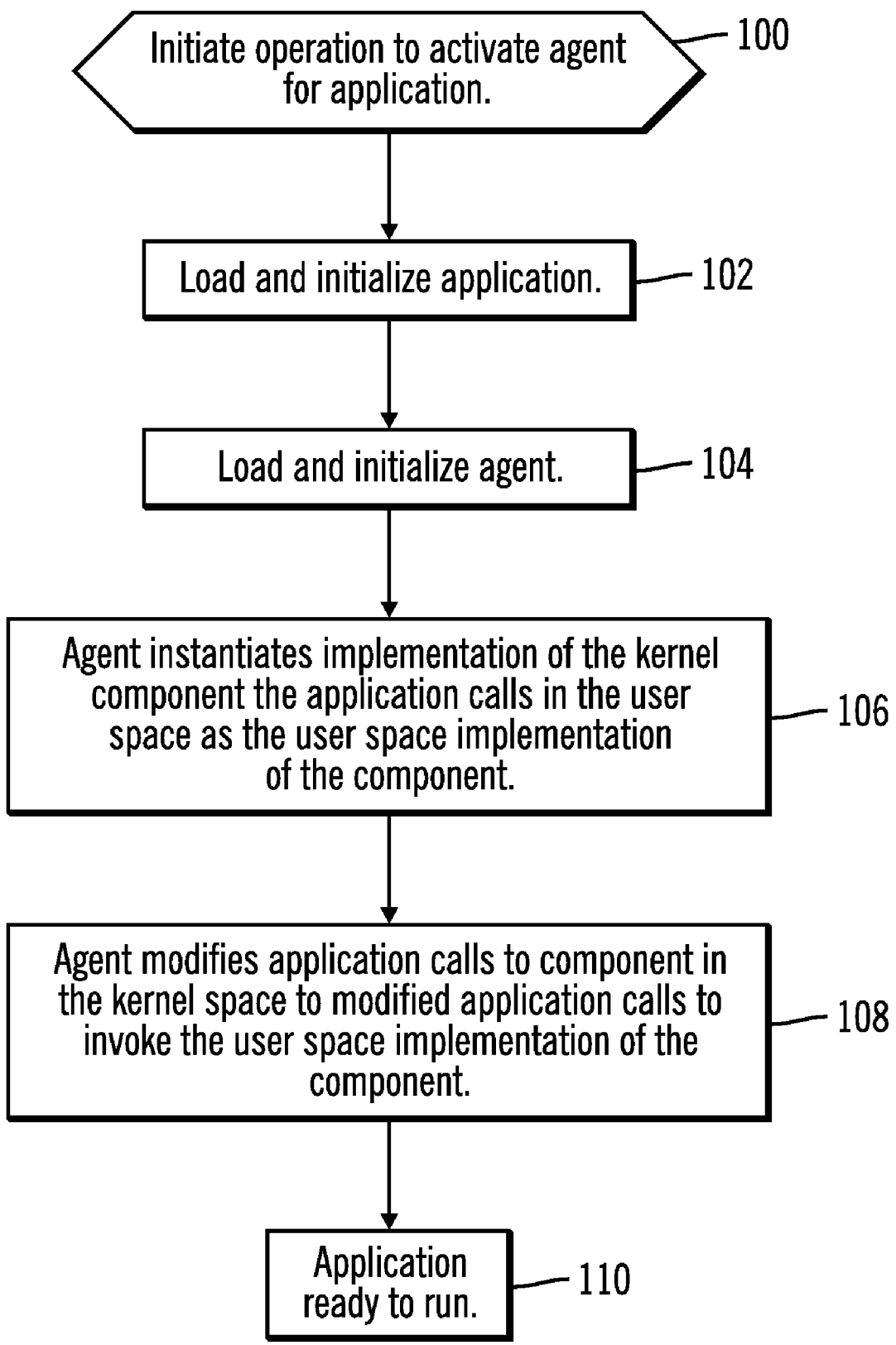
FIG. 3 illustrates an embodiment of operations activate an agent that gathers state and system information for an application.

FIG. 3 illustrates an embodiment of operations performed to load the agent 22 and initialize the user space component implementation 24. To initiate (at block 100) the operation to activate the agent 22, the application 12 is loaded and initialized (at block 102). The agent 22 may then be loaded and initialized (at block 104). The agent 22 instantiates (at block 104) an implementation of the kernel component 20 the application 12 calls in the user space 16 as the user space component implementation 24. In one embodiment, to enable the agent 22 to effectively intercept the application 12 calls to the component APIs 18, the agent 22 may modify (at block 108) the application calls to the component APIs 18 in the kernel space 14 to modified component APIs 18a, as shown in FIG. 2. The application 12 calling the modified component APIs 18a would invoke the user space component implementation 24 instead of the kernel component 20, which would be invoked by the pre translated component APIs 18. In this way, the agent 22 translates the component API 18 calls to redirect them to the user pace component implementation 24. The application 12 may then run (at block 110) and invoke the component APIs 18a to perform component operations in the user space 16. In one embodiment, the agent 22 may reside in the address space of the application 12 and comprise dynamic linked library (dll) files, such that the agent 22 dll is loaded when the application is loaded. The agent 22 may provide hooks that provide the namespace containment by translating the system identifiers and handles used in the component APIs 18 to modified component APIs 18a. Alternative techniques known in the art may be used to have the agent 22 intercept the application 12 calls to the component APIs 18 to redirect the calls to the user space component implementation 24.

Figure 4:
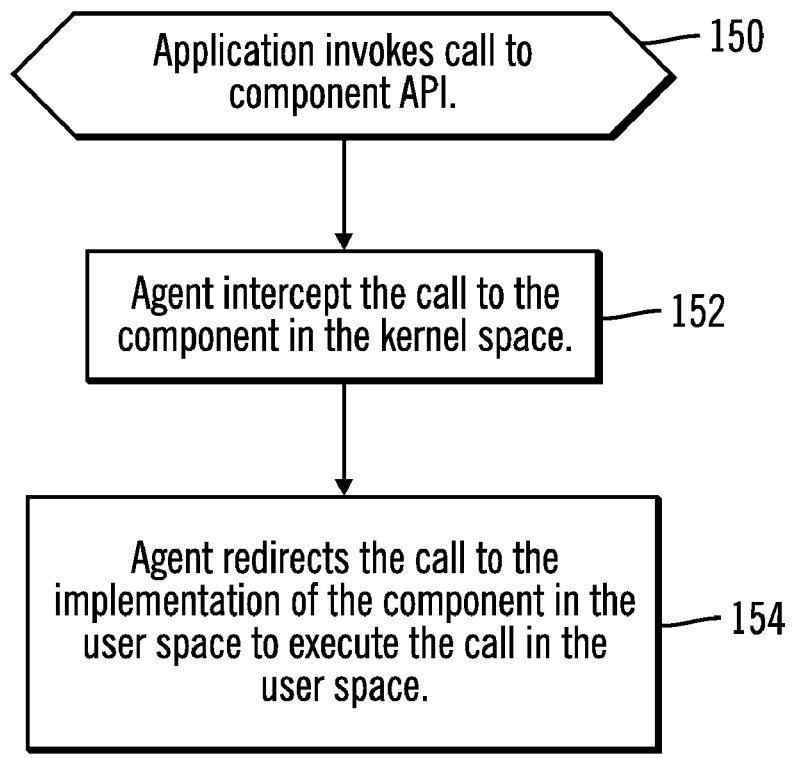
FIG. 4 illustrates an embodiment of operations to process an application call to a kernel component.

FIG. 4 illustrates an embodiment of operations performed when the application 12 calls a component API 18. Upon the application 12 invoking (at block 150) the call to one component API 18, the agent 22 intercepts (at block 152) the call to the component API 18, which was intended for the kernel space 14 component 20. The agent redirects (at block 154) the call to the user space component implementation 24 to execute the call in the user space 16. As discussed, in one embodiment, the application 12 calls to component APIs 18 in the kernel space 14 may be redirected by the agent 22 translating the component APIs 18 to modified component APIs 18a to invoke the user space component implementation 24.

Figure 5:
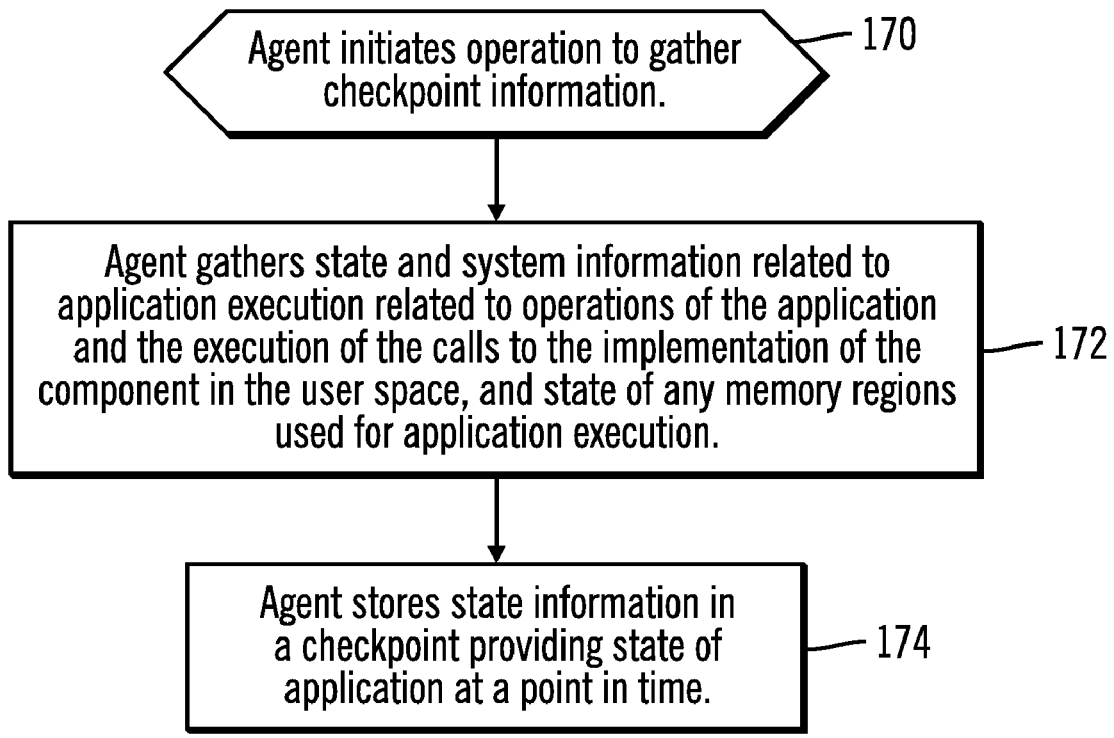
FIG. 5 illustrates an embodiment of operations to gather checkpoint information.

FIG. 5 illustrates an embodiment of operations performed by the agent 22 to gather state information for the application 12 to store in the checkpoint information 26. Upon initiating (at block 170) an operation to gather checkpoint information 26, the agent 22 gathers (at block 172) state and system information related to application execution, including information related to application operations and the execution of the calls to the user space component implementation 24, and the state of any memory region used for the application 12 execution in the user space. Further, because the system operations are implemented in the user space component implementation 24, the system data is maintained in the user space 16 in the data segment of the agent 22. The agent 22 stores (at block 174) the state and system information in the checkpoint information 26 providing the state of application at a point in time.

Once the state and system information is stored with the checkpoint information 26, a checkpoint manager or other program may resume the operation of the application 12 from the state represented in the checkpoint information 26. The address space of the recreated application 12 may be populated with the memory state information stored in the checkpoint information 26. To recreate an application 12, a new process for the application is created. The newly created process contains the executable image, ntdll.dll, PEB and other system regions such as ANSI code page, shared memory data, mapped at the top of the process address space. The data segment portions of the executable image and ntdll.dll are overwritten from the respective contents saved in the checkpoint information 26. The rest of the address space of the process may be populated with the memory regions described by the checkpoint information 26. The application 12 default heap, thread stacks, regions containing the loader data and process environment variables, etc., are restored by mapping memory regions with appropriate size and attributes and overwriting them with the contents saved in the checkpoint information 26 without regard to their internal structure. In particular, the memory region containing the agent 22 is also mapped, so that the restarted instance of the process already has the agent 22 for subsequent checkpoints.

Described embodiments provide techniques to implement kernel space components 20 as user space component implementations 24 accessed by an application in the user space 16 to allow the gathering of state information related to the component execution from the user space 16. In certain proprietary operating systems, it may be difficult to access and gather state information on the kernel components an application calls from the kernel space 14. The described embodiments circumvent this limitation with proprietary and other operating systems by executing kernel components called by applications in the user space where system and state information on the component execution can be more easily gathered.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium comprises non-transitory storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In the described embodiments, the access parameters are changed for process accesses to memory addresses in a shared memory. In an alternative embodiment, access patterns may be monitored for computer resources other than memory addresses, such as addresses in a storage device and other computer resources.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    instantiating an implementation of a component, that is configured to execute in a kernel space, in a user space;
    invoking, by an application, a call to the component in the kernel space;
    intercepting the call to the component in the kernel space;
    invoking the implementation of the component in the user space to execute the call in the user space;
    translating the intercepted call to a format compatible with the implementation of the component in the user space, wherein the translated call invokes the implementation of the component; and
    gathering state information related to the execution of the call to the component in the user space and related to the execution of the implementation of the component in the user space that is called to include in checkpoint information for the application.

2. The method of claim 1, wherein the checkpoint information includes system information related to operations of the application and the execution of the call invoking the implementation of the component in the user space, and a state of memory regions used by the application.

3. The method of claim 1, wherein the implementation of the component in the user space comprises a subsystem that executes in the user space, and wherein the state information of the subsystem related to the call from the application is gathered for the checkpoint information.

4. A method, comprising:
instantiating an implementation of a component, that is configured to execute in a kernel space, in a user space;
invoking, by an application, a call to the component in the kernel space;
intercepting the call to the component in the kernel space;
invoking the implementation of the component in the user space to execute the call in the user space;
gathering state information related to the execution of the call to the component in the user space and related to the execution of the implementation of the component in the user space that is called to include in checkpoint information for the application;
loading and initializing the application; and
loading an agent in response to loading the application, wherein the agent intercepts the call to the component in the kernel space and invokes the implementation of the component in the user space.

5. The method of claim 4, wherein the agent instantiates the implementation of the component to execute in the kernel space in the user space.

6. The method of claim 4, wherein intercepting the call comprises:
modifying, by the agent, the call made by the application to invoke the implementation of the component in the user space to execute the call in the user space.

7. The method of claim 4, wherein the component comprises a network communication data structure residing in the kernel space that is used to process network communication packets, and wherein the implementation of the component in the user space comprises the network communication data structure in the user space used to process the network communication packets.

8. The method of claim 4, wherein the component comprises a graphics engine residing in the kernel space that is used to render graphics, and wherein the implementation of the component in the user space comprises a graphics subsystem in the user space used to process calls to the graphics engine and render graphics.

9. A system, comprising:
at least one processor;
a memory including an application; and
a computer program in the memory executed by the processor to perform operations, the operations comprising:
instantiating in the memory an implementation of a component, that is configured to execute in a kernel space, in a user space;
invoking, by the application, a call to the component in the kernel space;
intercepting the call to the component in the kernel space;
invoking the implementation of the component in the user space to execute the call in the user space;
gathering state information related to the execution of the call to the component in the user space and related to the execution of the implementation of the component in the user space that is called to include in checkpoint information for the application;
loading and initializing the application; and
loading an agent in response to loading the application, wherein the agent intercepts the call to the component in the kernel space and invokes the implementation of the component in the user space.

10. The system of claim 9, wherein the checkpoint information includes system information related to operations of the application and the execution of the call to invoke the implementation of the component in the user space, and a state of memory regions used by the application.

11. The system of claim 9, wherein the implementation of the component in the user space comprises a subsystem that executes in the user space, and wherein the state information of the subsystem related to the call from the application is gathered for the checkpoint information.

12. The system of claim 9, wherein the agent instantiates the implementation of the component to execute in the kernel space in the user space.

13. The system of claim 9, wherein intercepting the call comprises:
modifying, by the agent, the call made by the application to invoke the implementation of the component in the user space to execute the call in the user space.

14. The system of claim 9, wherein the component comprises a member of a set of components including:
a network communication data structure residing in the kernel space that is used to process network communication packets, and wherein the implementation of the component in the user space comprises the network communication data structure in the user space used to process the network communication packets; and
a graphics engine residing in the kernel space that is used to render graphics, and wherein the implementation of the component in the user space comprises a graphics subsystem in the user space used to process calls to the graphics engine and render graphics.

15. An article of manufacture comprising at least one of a computer readable storage medium having code and a hardware device having hardware logic executed to communicate with a memory and an application and perform operations, the operations comprising:
instantiating an implementation of a component in the memory, that is configured to execute in a kernel space, in a user space;
invoking, by the application, a call to the component in the kernel space;
intercepting the call to the component in the kernel space;
invoking the implementation of the component in the user space to execute the call in the user space;
translating the intercepted call to a format compatible with the implementation of component in the user space, wherein the translated call invokes the implementation of the component; and
gathering state information related to the execution of the call to the component in the user space and related to the execution of the implementation of the component in the user space that is called to include in checkpoint information for the application.

16. The article of manufacture of claim 15, wherein the checkpoint information includes system information related to operations of the application and the execution of the call to invoke the implementation of the component in the user space, and a state of memory regions used by the application.

17. The article of manufacture of claim 15, wherein the implementation of the component in the user space comprises a subsystem that executes in the user space, and wherein the state information of the subsystem related to the call from the application is gathered for the checkpoint information.

18. The article of manufacture of claim 15, wherein the component comprises a network communication data structure residing in the kernel space that is used to process network communication packets, and wherein the implementation of the component in the user space comprises the network communication data structure in the user space used to process the network communication packets.

19. The article of manufacture of claim 15, wherein the component comprises a graphics engine residing in the kernel space that is used to render graphics, and wherein the implementation of the component in the user space comprises a graphics subsystem in the user space used to process calls to the graphics engine and render graphics.

20. An article of manufacture comprising at least one of a computer readable storage medium having code and a hardware device having hardware logic executed to communicate with a memory and an application and perform operations, the operations comprising:
   instantiating an implementation of a component in the memory, that is configured to execute in a kernel space, in a user space;
   invoking, by the application, a call to the component in the kernel space;
   intercepting the call to the component in the kernel space;
   invoking the implementation of the component in the user space to execute the call in the user space;
   gathering state information related to the execution of the call to the component in the user space and related to the execution of the implementation of the component in the user space that is called to include in checkpoint information for the application;
   loading and initializing the application; and
   loading an agent in response to loading the application, wherein the agent intercepts the call to the component in the kernel space and invokes the implementation of the component in the user space.

21. The article of manufacture of claim 20, wherein the agent instantiates the implementation of the component to execute in the kernel space in the user space.

22. The article of manufacture of claim 20, wherein intercepting the call comprises:
   modifying, by the agent, the call made by the application to invoke the implementation of the component in the user space to execute the call in the user space.

* * * * *